United States Patent [19]

Kiser et al.

[11] 4,250,029

[45] Feb. 10, 1981

[54] COATED MEMBRANES

[75] Inventors: Ernest J. Kiser, Iowa City, Iowa; James A. Latty, Seal Beach, Calif.

[73] Assignee: Rohm and Haas Company, Philadelphia, Pa.

[21] Appl. No.: 790,523

[22] Filed: Apr. 25, 1977

[51] Int. Cl.³ .............................................. B01D 13/00
[52] U.S. Cl. ................................... 210/652; 210/490; 210/650; 210/654; 210/500.2; 427/407
[58] Field of Search ................. 210/23 H, 490, 500 M

[56] References Cited

U.S. PATENT DOCUMENTS

| | | | |
|---|---|---|---|
| 3,228,877 | 1/1966 | Mahon | 210/500 M X |
| 3,331,772 | 7/1967 | Brownscombe et al. | 210/500 M X |
| 3,462,362 | 8/1969 | Kollsman | 210/23 H |
| 3,556,305 | 1/1971 | Shorr | 210/490 |
| 3,724,672 | 4/1973 | Leonard et al. | 210/500 M X |
| 3,737,042 | 6/1973 | Boom | 210/500 M X |

*Primary Examiner*—Frank A. Spear, Jr.
*Attorney, Agent, or Firm*—Louis F. Kline, Jr.

[57] ABSTRACT

Novel membranes having two or more coatings of polyelectrolytes with at least one oppositely charged adjacent pair of coatings separated by a neutral layer to reduce charge neutralization, their method of preparation, and use for rejecting ionically charged solutes.

20 Claims, No Drawings

COATED MEMBRANES

The present invention relates to novel coated membranes having two or more coatings of polyelectrolytes with at least one oppositely charged adjacent pair separated by a layer of material which substantially prevents charge neutralization, and methods of preparing and using the same. In a preferred embodiment, the membranes have at least one pair of adjacent oppositely charged polyelectrolytes separated by a neutral, porous polymer and are useful for the deionization of aqueous streams.

The molecular weight (MW) cutoff of a membrane is the minimum molecular weight for material which will be rejected and not pass through the membrane. Although low molecular weight cutoff membranes can be produced, e.g., flat sheet membranes, they are generally deficient in their low capacity or flux rates. In the case of polymeric hollow fiber UF membranes, operating pressures approaching the burst pressure of the membrane have been required in the past to obtain reasonable capacity with low MW cutoff. Reverse osmosis, generally used for separation of smaller molecules, has the disadvantage of requiring relatively high pressures for separation.

The deionization of liquids, especially water, has been extensively studied using reverse osmosis (herein alternatively RO, sometimes referred to as hyperfiltration HF), electrodialysis (ED), ultrafiltration (UF), and other techniques employing membranes. The types of membranes used have included both inorganic and organic polymeric materials, ceramics, glass frits, porous metals, graphite, and the like. A principal technique involves using a very "tight" membrane with openings (pores) sufficiently small to reject a portion of the larger ions and molecules. Another important method uses membranes having ion exchange properties. Still another method, and the one most relevant to the present invention, uses "charged" membranes to repel ions and thereby prevent their passage through the membrane pores. As is extensively reported in the literature heretofore, electrodialysis and reverse osmosis are considered generally to be less than ideal for deionization due to the necessary process costs incurred in maintaining high current densities and high pressure, respectively, as well as the relatively expensive membranes required to withstand the extreme process conditions of these methods.

Ultrafiltration (UF) membranes, such as the modern hollow fiber membranes, have the capability of very high permeation rates (flux) by virtue of their large surface areas in a relatively small volume, and other factors, but are not generally useful for separation of small molecules, that is, those having molecular weights below about 1,000. The low operating pressures of UF membranes (up to 150 psi) and the high shear forces existing at the surface, which minimizes concentration polarization by rejected solutes, make UF highly desirable for concentrating or fractionating industrial streams where it is desirable to separate one or more molecules from solvent and/or molecular species of significantly smaller sizes and weights. Although UF hollow fiber membranes have been extensively used heretofore for fractionating industrial streams (e.g., the recovery of protein from cheese whey), removal of colloidal and suspended matter from aqueous and non-aqueous streams, electrocoating paint applications, and cold sterilization, the scope of additional applications has been somewhat inhibited by an inability to economically furnish UF membranes with controlled pore sizes needed to reject smaller molecular species and also having good capacity.

Desalination of water using hyperfiltration (or RO) with dynamic membranes having very small pores has been taught in the prior art (see U.K. Patent Specification No. 1,135,511, published Dec. 4, 1968). This process suffers largely from the need for very high pressures (e.g., 350–3000 p.s.i.) and the fugitive nature of the dynamic membrane under such extreme pressures. Although the use of polyelectrolytes as membrane components is taught, the inherent nature of the dynamic membrane would seem to preclude use of discrete layers of oppositely charged polyelectrolytes.

Ion rejection with RO membranes having thin films of polyelectrolyte polymers cast or dip-coated onto a porous support has been studied and reported upon extensively in the literature. Such membranes, sometimes termed "composite membranes" are expensive to prepare and use but yield relatively good salt rejection (see, e.g., Sachs, S. B., and Lonsdale, H. K., *Preparation and Properties of Poly (acrylic acid) Composite Membranes,* Journal of Applied Polymer Science, Vol. 15, pages 797–809 (1971)). (Also see, Scala, L. C., et al U.S. Pat. No. 3,744,642). Another variation of composite membranes involves formation of a relatively thick charged membrane, e.g., having a thickness of less than about 50 Å by an in situ reaction on the surface of a porous membrane substrate, e.g., a cellulose acetate substrate (see, Lonsdale H. K. et al., *Research and Development Progress Report No.* 484, U.S. Department of the Interior, Office of Saline Water, 1969). The composite membranes have shown a decided tendency to foul, particularly poly(acrylic acid) on a polysulfone membrane substrate, when tested under reverse osmosis methods. Further, most of the polyelectrolyte deposited upon a substrate by this technique is rapidly dissolved on exposure to water, leaving only a very thin layer on the substrate surface (Sachs, S. B., supra).

Gels, polymers, and/or single polyelectrolytes have been "coated" on the surface of membrane substrates to improve pressure-rejection characteristics, salt rejection, and the like with various types of RO and UF membranes (see, e.g., Massucco, A. A., U.S. Pat. No. 3,556,992; Shorr, J., U.S. Pat. No. 3,566,305). Single layers of polyelectrolytes have been attached to a membrane substrate using an adhesive polymer to hold polyelectrolyte and substrate together (Shorr, J., supra). Perhaps the most outstanding attribute of these "coated" membranes is the limited amounts of materials needed to improve ion rejection characteristics and their ease of application. However, while single layer "coatings" are useful for certain limited ion rejection applications, when the coating materials are not washed quickly from the substrate surface, the ability to reject both cationic and anionic solutes would obviously be preferable in many applications.

The advantage of forming a membrane with both cationic and anionic charges to reject ions is taught in the more recent patents to Gregor (U.S. Pat. No. 3,808,305 issued Apr. 30, 1974 and U.S. Published Application No. B 433,930 issued Mar. 23, 1976). Both high flux rate and low pressures are among the outstanding features claimed by Gregor for his bipolar membranes. The method for producing these bipolar membranes involves preparation of uniformly charged membranes optionally "sandwiched" together with oppositely charged membranes touching or separated by a neutral, i.e., nonionic, membrane layer. Since the charged membrane layers of the "sandwich" are produced by dispersing or dissolving a polyelectrolyte in a polymer matrix, eventually cross-linked, the polyelectrolyte is obviously located throughout the entire membrane, not merely as a concentrated charged barrier at the surface of the membrane, and by virtue of being rigidly fixed into the polymer backbone is subject to being blocked substantially from interfacing with the charged matter in the process fluids. Relatively large amounts of polyelectrolytes are used in the cross-linked membranes (typically 10% to 80% by weight of the membrane), thus substantially affecting membrane cost, composition, character and/or strength.

Not withstanding the intrinsic disadvantages of the economics, composition and physical structure of the prior art "sandwiched" bipolar membranes, the idea of rejecting charged materials using one or more layers of oppositely charged materials fixed into the membrane appears to offer many advantages. It has been demonstrated, (for example, by Gregor U.S. Pat. No. 3,808,305) that salts, dyes and proteins are substantially, if not completely, separated from a host aqueous medium using charged membranes and low pressures (e.g., between 60 and 100 p.s.i.). Accordingly, the prior art techniques of deionization show promise for furnishing an attractive means of separating materials, but clearly have many detracting features which need to be overcome to maximize their practicality and performance.

This invention offers novel membranes and techniques capable of performing deionization of liquids with at least the same overall performance of the prior art materials but in a simpler, more economical and practical manner. Thus the invention involves a substantial technical advance in the field of deionization.

By the present invention there are furnished membranes having two or more layers of polyelectrolytes of opposite charge separated by a neutral layer, which polyelectrolytes are affixed to semipermeable membranes as "coatings". The polyelectrolyte coatings are usually extremely thin and are commonly deposited on the surface of the membrane in direct contact with the process solution. Alternatively, the opposite sides of a thin membrane film may be coated with the same or different polyelectrolytes, using the membrane itself as the neutral layer to separate charged, normally oppositely charged, polyelectrolytes. In a preferred embodiment of the invention, the polyelectrolytes are all located on the surface of the membrane in contact with the process fluid and are separated by a porous, neutral polymer layer.

The membranes which are to be coated, that is, serve as the substrate for the coated membranes of the invention, need not in any way differ from ordinary semipermeable membranes used heretofore for UF, RO, ED or other filtration processes. Accordingly, it is a principal advantage of the invention that membranes prepared by known methods and having composition which is known to yield optimum strength, durability and/or permeation characteristics, etc. can be produced to conform with such desideratum and thereafter easily converted to deionization membranes by the present invention without loss of their desired physical properties.

The polyelectrolyte and nonionic "coatings" or "layers" of the invention are extremely thin relatively uniform coatings deposited on one or more surfaces of the membranes from a solution or fine dispersion of the coating material, normally an aqueous solution. The method of application requires that the solution be passed over the membrane surface to be coated for an extended period, e.g., normally at least about 15 minutes, until effective amounts of material deposit on the membrane. When deposited in this manner, especially in accordance with the preferred order of application as explained hereinafter, the polyelectrolytes form substantive coatings on all types of membrane materials capable of enduring long periods of operation and even backflushing of permeate, used in hollow fiber UF operations to clean fouled membrane surfaces.

Microscopic observations of the coatings of this invention on membrane substrates indicate that the coatings, while relatively uniform over the entire membrane surface, are not necessarily continuous film-like layers as are the membranes deposited on a porous substrate to form the "composite membranes" of the prior art. Rather, these coatings usually exhibit domains of relatively high and low concentration of polyelectrolyte, in what may be termed a variegated effect. A top view of a coated membrane shows microscopic hills and valleys of polyelectrolyte coating formed on the original smooth skin of the membrane. These hills and valleys are quite pronounced on membranes coated with multiple layers of different polyelectrolytes, especially when oppositely charged coatings are unseparated or separated by only a thin layer of neutral polymer. The nonuniform interactions of the charged species apparently orient the coating into a random, uneven surface.

As with the "sandwiched" charged membranes of the prior art, the coated membranes disclosed herein are highly effective for deionizing solutions at relatively high flux rates, particularly aqueous solutions, although there is fixed on the surface only a small fraction of the amount of polyelectrolyte needed for such purpose heretofore. Further, the multiple coatings appear to roughen the membrane surface, producing a desirable turbulent flow in fluiddynamic processes which may reduce the concentration polarization effect at the fluid/membrane interface. Selection of an anionic polyelectrolyte for the final coating layer at the interface with the process fluid can result in a membrane which resists fouling much longer than usually occurs when processing many waters containing colloids and/or organic decomposition products such as fulvic and humic acids.

Coated membranes can be formed by the invention having much lower molecular weight (MW) cutoffs than the precursor uncoated membranes. On the other hand, it is believed that the MW cutoff of the uncoated membrane may be altered little when thin coatings of high charge density polyelectrolytes are applied. Multiple coatings using polymeric materials of relatively greater strength than the membrane matrix polymer actually add to the burst strength of the membranes, as contrasted to prior art methods of chemically combining these same general types of polymers diluting the polymer backbone and thereby possibly reducing burst strength.

Although no theory is relied upon for the operability of the invention, which has been exhaustively demonstrated by practical examples some of which are presented below, it appears that the thin coatings of polyelectrolytes reject ions very effectively due to the concentration of high charge in the proximity of the membrane surface. The same has been found to occur when one polyelectrolyte (preferably a cationic) is coated on the permeate side of the membrane, with an oppositely charged polyelectrolyte (preferably an anionic) on the process fluid side. Ostensibly, the polyelectrolyte on the permeate side has sufficent charge strength, and is located such as to repel ions attempting to permeate the membrane. It must be concluded therefore for deionization that the amount of polyelectrolyte is relatively minor in importance to its location and possibly the uniformity of its distribution along the membrane surface. Therefore, for any given amount of polyelectrolytes, more effective ion rejection is obtained by the membranes of the invention when compared to the prior art membranes.

The preferred membrane substrates for the invention are the organic polymeric membranes commonly used in low pressure (150 p.s.i. and lower) ultrafiltration processes, especially the hollow fiber membranes, including linear thin channel (LTC) membranes, and those used for moderate pressure (up to about 300–400 p.s.i.) reverse osmosis processes, including flat sheet membranes used in LTC modules. Such membranes are produced from a variety of polymers such as polyimide, polysulfone, styrene-acrylonitrile, polycarbonates, polyvinyl chloride, copolymers of polyvinyl chloride with a modacrylic polymer, cellulose acetate, polyamide/imide, aliphatic and aromatic nylons, polyamides, polyacrylonitrile, polyphenyleneoxide, etc. In a particularly preferred aspect, the invention is useful in ultrafiltration employing thin channel membranes, such as hollow fiber spiral wound, LTC and various modification thereof. Anisotropic hollow fiber membranes (commercially available from Romicon, Inc., Woburn, Massachusetts) having single coherent structures which can withstand pressures on either side of the active membrane surface (skin) without rupture, are a preferred class of starting materials. The anisotropic hollow fiber UF membranes are designed to allow relatively "dirty" industrial streams to flow through the lumen (or inside channel) of the fiber with minimum prefiltration. This fiber has a very tight thin skin on the inside surface supported by a sponge-like outer structure which adds substantial support to the fiber and, because of this integral structure, fouling can be removed by flowing a fluid in the reverse direction from the outside of the fiber to the inside without delaminating the membrane skin from the support structure. This membrane cleaning technique is called "backflushing". The polyelectrolyte coatings are capable of withstanding repeated backflushing cycles without loss of performance.

Initial molecular weight cutoffs of the commercially available ultrafiltration hollow fibers are generally 2,000, 10,000, 50,000, or 80,000 depending on the type of filtration desired. Coating of these fibers with polyelectrolytes can reduce the molecular cutoffs substantially. Depending upon the composition of the coating, molecular weight cutoffs of any values may be produced, such as 150, 200, 400, 600 and 1000 for initial 50,000–80,000 MW cutoff membranes. These low cutoffs have not previously been attainable at practical costs with membranes having a desirable flux at low pressure. Some typical hollow fiber UF membranes supplied by Romicon, Inc. have the molecular weight cutoffs and other characteristics set forth in Table A.

TABLE A

ROMICON ULTRAFILTRATION MEMBRANES

| Identifying Code Membrane | Nominal Molecular Weight Cutoff | Apparent Pore Diameter °A | LTC Water Flux (GSFD) @ 55 PSI | Hollow Fiber Water Flux (GSFD) @ 25 PSI |
|---|---|---|---|---|
| UMO5 | 500 | 21 | 5 | — |
| UM2 | 2,000 | 24 | 9 | — |
| AM2 (HF) | 2,000 | 24 | — | 50 |
| UM10 | 10,000 | 30 | 40 | — |
| PM5 | 5,000 | 27 | — | 70 |
| PM10 | 10,000 | 38 | 360 | 90 |
| PM30 | 30,000 | 47 | 540 | — |
| XM50 | 50,000 | 66 | 180 | 100 |
| HM | 80,00 | 90 | 180 | — |
| GM80 | 80,000 | 90 | — | 150 |
| XM100A | 100,000 | 110 | 675 | — |
| XM300 | 300,000 | 480 | 1350 | — |

The polyelectrolyte "coating" (which term is used herein to denote a substantially uniform layer bonded to an active membrane surface, such as the skin of a hollow fiber membrane or a porous non-ionic polymer layer) may be applied by passage of a solution containing the polyelectrolyte over (or through) the membrane side to be coated. The polyelectrolyte forms as a tenacious, virtually permanent coating under ordinary operating pressures, such as those commonly used when separating substances using various types of membranes.

Polymeric cationic polyelectrolytes of relatively high molecular weight, i.e., above 100,000 and preferably above 500,000 and having water or other solvent solubility at the desired levels of application, are generally suitable as coating materials for the deionization membranes of the invention. Low molecular weight polyelectrolytes are of limited utility since they tend to migrate causing charge loss and/or neutralization. These polymeric materials are substantive to the membrane surface or the nonionic layer and are sufficiently large in MW to be rejected. Both high charge density materials and low charge density materials are useful as coating materials, but high charge density materials are preferred.

The anionics useful by the invention are polymeric anionic polyelectrolytes of relatively high molecular weight, i.e., above about 50,000 preferably above 500,000 and which are water or other solvent soluble at the desired levels of application. Since the anionics are preferably applied as a final coating, after the cationics and on the same side of the membrane as the coatings, there is no essential requirement that the anionics be substantive to the membrane. It is believed that the opposite charge of the previously applied cationic coating is sufficient to bind the anionic polyelectrolyte. As with the cationics, the anionic polyelectrolytes may have either high or low charge density, or anything between these extremes, but high charge density is preferred.

Also included within the group of polyelectrolytes which are useful by the invention are materials which can be solubilized by an organic solvent and applied as a coating therefrom. Since membrane materials are damaged by certain solvents, such as those containing the carbonyl group, i.e., ketones and aldehydes, the solvents used for a given membrane composition should be selected carefully. In general, however, many alcohols and ethers are suitable for use with common membrane materials.

When both cationic and anionic polyelectrolyte coatings are to be applied to the same side of a membrane, such as on the lumen side of a hollow fiber, they may be separated by a nonionic or neutral layer which may be deposited in the same manner as the polyelectrolytes. This neutral layer separates the oppositely charged polyelectrolyte coatings preventing neutralization of the charges. Suitable preferred nonionic polymers which may comprise the neutral layer are water or other solvent soluble porous polymers or film-forming materials of high molecular weight, i.e., higher than about 1,000 and preferably higher than 10,000, such as nonionic polyelectrolytes (having a low charge density) starches, cellulose based compounds, alcohols and the like. Ampholytes, that is, materials having both acidic and basic functional groups have also been found useful, apparently due to their ability to firmly attach to both polyelectrolytes. Materials with a light negative or stray charge may also be suitable for attachment to the cationic polyelectrolyte.

In addition to neutral polymers and ampholytes, the neutral coating may be formed in situ by the neutralization of the anionic and cationic at the interface between the two charged layers. Of course, forming a neutral layer from charged polyelectrolytes normally requires use of greater quantities of each than would be required for an equivalent level of salt rejection since substantial amounts of polyelectrolyte are lost in the neutralized portion of the coating.

An alternative method of coating a substrate by the present invention involves forming the coating concurrently with forming the membrane substrate. Thus, a polyelectrolyte may be incorporated in the casting or spinning solution used to form the membrane, being deposited on the surface thereof as the solution permeates the membrane. The advantage of this procedure is that it eliminates the need for post-treating the membrane for ion rejection properties and can result in affixing the polyelectrolyte more permanently to the membrane surface.

For most applications, the initial coating solution will usually contain not more than about 2,000 parts per million (ppm) of a cationic polyelectrolyte such a poly (vinylimidazoline), preferably not more than 500 ppm. Very minute amounts of cationic, down to a fraction of a part per million (e.g., ½ ppm), are useful for some purposes, such as surface roughening or reducing MW cutoff. In general, however, it is preferred to apply a concentration of cationic of about 25–500 ppm, and combine this with a neutral polymer layer such as poly (vinyl alcohol), followed by an anionic polyelectrolyte.

There is a distinct interrelationship between the cationic, anionic and neutral layers in reducing molecular weight cutoff. Large amounts of cationic or anionic, such as 500–1000 ppm or greater, are individually needed in a single coating to achieve the same MW cutoff reduction as may be obtained from much lesser amounts of the two combined, e.g., ca. 50 ppm of each. Further, a neutral polymer layer can significantly affect MW cutoff when applied between the oppositely charged polymers. For instance, a "thicker" coating of PVA tends to moderate the reduction of MW cutoff, whereas a "thin" coat, or no neutral layer at all, tends to promote more substantial reduction of the MW cutoff. Apparently, this phenomenon is due to the capacity of the neutral layer to separate the oppositely charged polymers preventing their interaction.

The anionic polyelectrolyte is usually deposited last to aid in repelling the negatively charged impurities such as colloids that are found in most unfiltered waters, which materials are capable of fouling most membranes. If deposited without an anionic layer, the cationics tend to accentuate the fouling problem.

There is a wide difference between the various anionic polyelectrolytes as to their capacity for reducing the molecular weight cutoffs when used in conjunction with a cationic and neutral layer. Certain anionics, such as poly(acrylic acid) (PAA) with high charge density, will reduce MW cutoff (and normally flux) significantly when applied from aqueous solutions containing only a few parts per million of polyelectrolyte. Others, such as poly(styrene sulfonic)acid, an anionic of lower charge density, must be applied from more concentrated solutions, e.g., having about 100–2000 ppm of polyelectrolyte. Broadly stated, when used preferably with a cationic and neutral layer, the anionic polyelectrolyte will be applied from an aqueous solution having between about 0.5 ppm and 2000 ppm of anionic. A preferred concentration for low charge density anionics is 100–1000 ppm. At levels substantially above the preferred values, membrane flux is reduced to an undesirable extent. To avoid excessive flux reduction while obtaining high ion rejection a combination of both high charge density and low charge density anionics has been found preferable for reducing MW cutoffs.

The neutral layer is applied from aqueous solutions at concentrations of between about 5 ppm and 1000 ppm of the "nonionic". A preferred concentration is between about 50 ppm and 200 ppm.

The following table lists a number of specific polyelectrolytes, nonionics and other coating materials useful by the invention and refers to the abbreviations used herein to identify the same.

TABLE B

| Charge* | Abbreviation | Material |
|---|---|---|
| + | PVI | poly(vinylimidazoline) |
| − | PSS | poly(styrene sulfonic) acid |
| − | PTS | poly(tolulene sulfonic) acid |
| + | PEI | poly(ethylenimine) |
| − | V7PSS | (7 million MW) PSS |
| − | V5PSS | (500,000 MW) PSS |
| + | C32PEI | Dow's Purifloc C-32 (mainly PEI) |
| + | PADMAC | Poly(diallyldimethyl-ammonium chloride) |
| 0 | HEC | Hydroxyethylcellulose |
| 0 | CEC | Carboxyethylcellulose |
| 0 | STARCH | Potato starch |
| 0 | CMC | Carboxymethycellulose |
| 0 | PAAM | poly(acrylamide) |
| + | PVBTMA | poly(vinylbenzyl-trimethyl ammonium chloride) |
| − | PVSA | poly(vinyl sulfonic) acid |
| 0 | PVA | poly(vinyl alcohol) |
| − | PAA | poly(acrylic) acid |

* + = cationic
− = anionic
0 = neutral (only slightly charged or amphoteric)

In addition to the polyelectrolytes and neutral materials given above in Table B, the invention may be practiced with a wide variety of other materials. Other suitable cationic polyelectrolytes include poly(4-vinylpyridine), poly(dimethylaminoethyl methacrylate), poly(dimethylaminoethyl acrylate), poly(t-butylaminoethyl methacrylate), poly(t-butylaminoethyl acrylate), poly(dimethylaminopropyl acrylamide), and poly(vinyl amine). All of the foregoing are weak base polyelectrolytes having a pH sensitive charge. Suitable fixed charge cationic polyelectrolytes include poly(methacryloyloxyethyltrimethylammonium methyl sulfate), poly(N-methyl-4-vinylpyridinium chloride), poly(N-acrylamidopropyl-3-trimethylammonium chloride), poly(acryloxyethyldimethylsulfonium chloride), and poly(glycidyltributylphosphonium chloride). The anionic polyelectrolytes which may be used include poly(methacrylic acid), poly(itaconic acid), hydrolyzed poly(styrene/maleic anhydride), poly(vinylphosphonic acid) and xanthan gum. Polymers which may serve as a preferred neutral layer also include poly(vinyl pyrolidine), poly(ethylene oxide), poly(methyl vinyl ether), poly(N-vinyl-4-methyl-2-oxazolidene), dextran, and guar gum.

When a coating of cationic material is followed by an anionic layer with little or no neutral layer between the charged layers, the permeation properties of a hollow fiber membrane seems to decrease, as compared to a single layer coating. Through electron microscopy, it has been determined that the multiple layers form an irregular surface on the membrane which is thought to cause more turbulent flow at the membrane wall under fluid dynamic operating conditions. The irregular surface appears to be due to the orientation of the oppositely charged particles. It is known that turbulence can reduce the so-called "solute concentration polarization effect" in the hollow fiber which would otherwise reduce flux.

Preparation of a coated membrane comprises passing a solution of the coating substance over the membrane for sufficient time to cause substantial deposition of the coating substance on that surface of the membrane in contact with the solution. Normally, the coating process takes from several minutes to several hours for each layer. With hollow fiber membranes coating times vary between fifteen minutes and four hours, preferably thirty minutes to two hours. For optimum results it is sometimes desirable to adjust the pH of the polyelectrolyte solution to the point where the polyelectrolyte is least ionized. Then the polyelectrolyte solution is circulated through the membrane system where it seeks deposition on the hydrophobic surface. The polyelectrolyte coating is thereafter converted slowly to the ionic form by adjusting the pH with the process fluid. For two or more coatings, the same procedure is repeated for each polyelectrolyte to be coated on the membrane surface.

By the present invention a membrane is normally coated on a single side, the side to be contacted by the fluid to be processed. However, for special applications one side, usually the process fluid side, may be coated to reduce MW cutoff and the other side coated to reject ions. It has been found that polyelectrolytes may be effectively coated on the sponge side of an anisotropic hollow fiber membrane to impart substantial ion rejection properties to the membrane. The UF backflush mode of operation is used to apply the polyelectrolytes to the sponge layer.

Illustrative coating procedures for membranes of different compositions and types is set forth below. The application of coatings usually employed fiber inlet pressures of 20-30 p. s. i. g. with a ΔP over the length of the fibers of about 5-30 p. s. i. g., and with the permeate side at atmospheric pressure. Generally, after each step the system is thoroughly rinsed with deionized water.

EXAMPLE 1

In a step by step procedure a typical hollow fiber ultrafiltration unit (cartridge) was treated to coat the inner skin of the fibers. Various salt rejection tests were completed after each step in the coating process as a qualitative measure of coating effectiveness, and are reported in Table I below.

Step 1—A new 20 mil, 2.5 sq. ft. hollow fiber membrane cartridge having no salt rejection capacity (type GM-80 anisotropic structure, vinyl chloride/acrylonitrile copolymer, Romicon, Inc., Woburn, Mass.) was thoroughly washed with approximately 5 liters of deionized water for one half hour to prepare it for the coating process.

Step 2—Two liters of a 25 ppm centrifuged and millipore (0.8μ) filtered poly(vinyl imidazoline bisulfate) (PVI) solution adjusted to pH 11.0 with NaOH was recirculated through the membrane for one hour. Then, deionized water was added to the process solution at a rate equal to the rate of permeation until a pH of 8.2 for the process solution was attained.

Step 3—Two liters of a 25 ppm centrifuged and millipore (0.8) filtered, pH 11.2 PVI solution was recirculated for one hour.

Step 4—Two liters of a $10^{-2}$ HCl solution was circulated for 10 minutes. Then the system was rinsed with deionized water until pH 7.0 was attained for both the process fluid and permeate.

Step 5—A solution of PVI prepared identical to that in Step 3 was circulated for one hour.

Step 6—Two liters of pH 8.2 poly(vinyl alcohol) (PVA) prepared by diluting 200 ml of saturated PVA to 2 liters was then recirculated for one hour. The PVA concentration was approximately 40 ppm.

Step 7—Three liters of 500 ppm, pH 2.2, poly(styrene sulfonic acid) (PSS) were then recirculated for one hour.

Step 8—Finally, 3 liters of a 1 ppm pH 2.6 poly(acrylic acid) (PPA) solution were circulated for one half hour completing the coating of the membrane.

TABLE I

| Step No. | Salt Type | Salt Conc. ppm | *Flux GSFD | Salt Rejection % |
|---|---|---|---|---|
| 2 | CaCl$_2$ | 580 | 129 | 28 |
| 3 | CaCl$_2$ | 550 | 114 | 28 |
| 4 | CaCl$_2$ | 425 | 126 | 36 |
| 5 | CaCl$_2$ | 360 | 112 | 50 |
| 6 | CaCl$_2$ | 260 | 103 | 58 |
| 7 | Na$_2$SO$_4$ | 580 | 21 | 42 |
| 7 | CaCl$_2$ | 500 | 21 | 93 |
| 8 | Na$_2$SO$_4$ | 770 | 13 | 89 |
| 8 | CaCl$_2$ | 520 | 12 | 93 |

*Flux is in gallons of permeate per square foot of membrane surface area per day.

EXAMPLE 2

An anisotropic 20 mil hollow fiber U. F. membrane, Romicon PM-10, "hollow fiber baggie" cartridge (a small laboratory-sized cartridge comprising ten fibers potted in epoxy and contained in a plastic bag which serves as the shell of the cartridge) was coated in a stepwise manner as described below. After each coating step and each salt rejection test, the system was rinsed with deionized water. The results of this coating procedure are indicated in Table II.

Step 1—The "baggie" was rinsed for one half-hour with deionized water to prepare it for coating.

Step 2—Two liters of a 25 ppm, centrifuged and millipore (0.8) filtered poly(vinylimidazoline bisulfate) solution adjusted to pH 11.0 with NaOH was recirculated through the membrane for one hour.

Step 3—Two liters of pH 7.0, poly(vinyl alcohol) prepared by diluting 100 ml of saturated PVA to 2 liters were then recirculated for one hour.

Step 4—Two liters of 100 ppm, pH 2.4 poly(styrene sulfonic acid) were then recirculated for one hour.

TABLE II

| Step # | Salt Type | Salt Conc. ppm | Pressure In psig | Pressure Out psig | pH | Flow GPM | Flux GSFD | Salt Rej. % |
|---|---|---|---|---|---|---|---|---|
| 1 | $H_2O$ | — | 30 | 0 | — | 0.90 | 102 | — |
| 2 | $CaCl_2$ | 372 | 30 | 0 | 7.0 | 0.90 | 38 | 83 |
| 3 | $Na_2SO_4$ | 375 | 30 | 22 | 7.0 | 0.48 | 14 | 53 |
| 4 | $CaCl_2$ | 390 | 30 | 22 | 7.0 | 0.48 | 13 | 72 |

EXAMPLE 3

A Biofiber 80 (T. M. of Dow Chemical Company) cellulose acetate HF membrane "Minibeaker" system was coated in a stepwise manner as described below. After each coating step and each salt rejection test, the system was thoroughly rinsed with deionized water.

Step 1—The system was rinsed for one hour with deionized water to prepare it for coating.

Step 2—Two liters of a 100 ppm, pH 8.95 PVI solution were recirculated through the membrane for two hours.

Step 3—Two liters of a 100 ppm, pH 10.5 PVI solution were recirculated through the system for two hours.

Step 4—Two liters of pH 8.2 PVA prepared by diluting 150 ml of saturated PVA to 2 liters were recirculated for one hour.

Step 5—Two liters of 100 ppm, pH 3.0 PSS were then recirculated for two hours.

Divalent ions both cationic and anionic were found to be rejected by the membrane of Example 3 following steps 2–5.

EXAMPLES 4–6

Following the procedures described in the foregoing examples, principally Example 1, Romicon XM-50 ("hollow fiber baggie") UF filters were coated with various concentrations of PVI, PVA, PSS and PAA to determine the effect of concentration (and reapplication) on divalent ion rejection. Salt rejection tests were conducted with $CaCl_2$ to show the effect of rejection of divalent cations and $Na_2SO_4$ to show rejection of divalent anions. The results are summarized in the following tables:

TABLE III (Example 4)

| Coating Steps | Treating Sol'n (DI $H_2O$)* | Times of Treatment Hours | Salt Type | Conc. ppm | Salt rej. % |
|---|---|---|---|---|---|
| 1 | 25 ppm PVI | 3.0 (dialysis mode)** | $CaCl_2$ | 610 | 57 |
| 2 | 200 ppm PVA | 1.5 | $CaCl_2$ | 510 | 62 |
| 3 | 400 ppm PSS | 1.5 | $Na_2SO_4$ | 430 | 22 |

TABLE III (Example 4)-continued

| Coating Steps | Treating Sol'n (DI $H_2O$)* | Times of Treatment Hours | Salt Type | Conc. ppm | Salt rej. % |
|---|---|---|---|---|---|
| 4 | 500 ppm PSS | 1.5 | $CaCl_2$ | 375 | 82 |
| 5 | 500 ppm PSS | 1.5 | $Na_2SO_4$ | 640 | 55 |
| 6 | 600 ppm PSS | 1.5 | $Na_2SO_4$ | 700 | 53 |

*Deionized Water
**Make-up DI $H_2O$ added to concentrate to maintain constant volume of solution.

TABLE IV (Example 5)

| Coating Steps | Treating Sol'n (DI $H_2O$) | Times of Treatment Hours | Salt Type | Salt Conc. | Rej. % |
|---|---|---|---|---|---|
| 1 | 25 ppm PVI | 1.5 | $CaCl_2$ | 295 | 29 |
| 2 | HCl* | 1.5 | $CaCl_2$ | 295 | 43 |
| 3 | 25 ppm PVI | 1.5 | $CaCl_2$ | 310 | 85 |
| 4 | 100 ppm PVA | 1.5 | $CaCl_2$ | 390 | 82 |
| 5 | 200 ppm PSS | 1.5 | $Na_2SO_4$ | 530 | 21 |
| 5 | | | $CaCl_2$ | 285 | 81 |
| 6 | 400 ppm PSS | 1.5 | $Na_2SO_4$ | 510 | 26 |
| 7 | 500 ppm PSS | 1.5 | $Na_2SO_4$ | 400 | 36 |
| 8 | 500 ppm PSS | 1.5 | $Na_2SO_4$ | 310 | 39 |
| 9 | 10 ppm PAA | 1.5 | $Na_2SO_4$ | 238 | 86 |

*Used to protonate the PVI polyelectrolyte.

A very dramatic increase in rejection of divalent anions is illustrated in the above Example 5 when coating with a minor amount of PAA (see Step 9).

TABLE V (Example 6)

| Coating Steps | Treating Sol'n (DI $H_2O$) | Times of Treatment Hours | Type | Salt Conc. | Rej. |
|---|---|---|---|---|---|
| 1 | 50 ppm PVI | 1.5 | $CaCl_2$ | 360 | 62 |
| 2 | 50 ppm PVI | 1.5 | $CaCl_2$ | 275 | 82 |
| 3 | 50 ppm PVI | 1.5 | $CaCl_2$ | 410 | 76 |
| 4 | 100 ppm PVA | 1.5 | $CaCl_2$ | 285 | 84 |
| 5 | 500 ppm PSS | 1.5 | $Na_2SO_4$ | 490 | 39 |
| 6 | 1 ppm PAA | 1.5 | $CaCl_2$ | 510 | 83 |
| 6 | | | $Na_2SO_4$ | 400 | 88 |

Divalent anion rejection is further illustrated in Example 6, with an even lower level of PAA. (see Step 6).

EXAMPLE 7

To evaluate the various coating procedures for molecule rejection using a given membrane, coatings were applied to a Romicon 45 mil XM-50 hollow fiber membrane (initial MW cutoff of 50,000) and the membranes were thereafter tested. The different coatings are as follows:

A. Three layer coating of PVI/PVA/PSS. A membrane was coated with 25 ppm of PVI followed by 200 ml saturated PVA diluted to one liter, followed by 600 ppm PSS.

B. Four layer coating of PVI/PVA/PSS/PAA. A membrane was coated with 50 ppm PVI, followed by 100 ml saturated PVA per one liter, followed by 500 ppm PSS, followed by 1 ppm PAA.

C. Two layer coating of PVI/PAA. Fibers were coated with 50 ppm PVI followed by 50 ppm PAA.

Each of the coated membranes A, B, and C above was tested by the normal UF mode for rejection of various solutes and Ca++ ions. The results follow:

| Coat-ing | Solute Type | Solute M.W. | HF Membrane Pressure In psig | HF Membrane Pressure Out psig | Re-tention Solute % | Ca++ Rej. % | Flux GSFD |
|---|---|---|---|---|---|---|---|
| A | Raffinose | 594 | 25 | 10 | 93 | 86 | 15.2 |
| B | Dye | 1,118 | 20 | 20 | 100 | 85 | 10.0 |
| B | Sucrose | 342 | 30 | 29 | 98 | 85 | 10.0 |
| B | Glucose | 184 | 30 | 29 | 74 | 85 | 10.0 |
| C | Sucrose | 342 | 30 | 29 | 93 | 13 | 5.0 |
| C | Glucose | 184 | 30 | 29 | 70 | 13 | 5.0 |

A substantial number of membranes "coated" by the process disclosed herein and illustrated above in Example 1 were prepared and tested for salt rejection. The data for such membranes are summarized hereinafter. The components of the coatings are indicated by abbreviations which are identified above in Table B. Unless otherwise identified, the starting membrane corresponds to the code designation of Table A. In general, each individual coating was applied in the sequence given from aqueous solution by recirculating such solution over the active membrane surface (lumen side) for 1.5 hours. Where a coating was applied to the opposite side of the active membrane surface, the example indicates the same by the term "backflush". Repeated coatings of the same polyelectrolyte were employed to increase salt rejection for a given ion when tests following a previous coating indicated less than the desired rejection. In many cases the repeated coating was applied using a higher level of polyelectrolyte in the coating solution.

| Example No. | Coating Composition (individual steps) | Membrane Type | Flux GSFD | Coated Membrane Properties Salt Tested | % Rejected |
|---|---|---|---|---|---|
| 8 | PVI/PVA/PSS/PSS/PAA/PAA | GM-80 | 10 | CaCl$_2$ | 86 |
|   | PVI/PVA/PSS/PSS/PAA/PAA | " | 10 | Na$_2$SO$_4$ | 88 |
| 9 | PVI/PEI/PVI/PVA/PVA/PSS/PAA | GM-80 (Baggie) | 12 | NaCl | 42 |
|   | PVI/PEI/PVI/PVA/PVA/PSS/PAA | GM-80 (Baggie) | 12 | Na$_2$SO$_4$ | 93 |
| 10 | PVI/PVI/PEI/PVI/PVI/PVA/PSS/PAA | GM-80 (Cart.) | 12 | Na$_2$SO$_4$ | 91 |
|   | PVI/PVI/PEI/PVI/PVI/PVA/PSS/PAA | GM-80 (Cart.) | 12 | NaCl | 42 |
| 11 | PVI/PVI/HCl/PVI/PVA/PSS | XM-50 | 13 | Na$_2$SO$_4$ | 36 |
|   | PVI/PVI/HCl/PVI/PVA/PSS | " | 25 | CaCl$_2$ | 76 |
| 12(a) | PVI/PVI/PVI/PVI/PVA/PSS | GM-80 (Bag) | 29 | CaCl$_2$ | 91 |
|   | PVI/PVI/PVI/PVI/PAA/PSS | GM-80 (Bag) | 33 | Na$_2$SO$_4$ | 35 |
| 12(b) | 12(a) plus PAA (1 ppm sol'n) | GM-80 (Bag) | 29 | Na$_2$SO$_4$ | 80 |
| 13 | PVI/PVI/PSS/PVSA/PAA | XM-100A | 8 | CaCl$_2$ | 79 |
|   | PVI/PVI/PSS/PVSA/PAA | " | 7 | Na$_2$SO$_4$ | 66 |
| 14 | PVI/PVI/HCl/PVI/PVA/PSS/PAA | GM-80 (Cart.) | 13 | Na$_2$SO$_4$ | 89 |
|   | PVI/PVI/HCl/PVI/PVA/PSS/PAA | (GM-80) (Cart.) | 12 | CaCl$_2$ | 93 |
| 15 | PVI/PVI/PVA/PSS | XM-50 | 24 | CaCl$_2$ | 69 |
|   | PVI/PVI/PVA/PSS | " | 24 | Na$_2$SO$_4$ | 74 |
| 16 | PVI/PAAM/PSS | XM-50 | 28 | Na$_2$SO$_4$ | 51 |
|   | PVI/PAAM/PSS | " | 28 | CaCl$_2$ | 11 |
| 17(a) | PVI-PEI/C$_7$PVA/C$_7$PVA/PAAM/PSS/PSS | XM-50 | 27 | CaCl$_2$ | 61 |
|   | PVT-PET/c$_7$PVA/C$_7$PVA/PAAM/PSS/PSS | " | 26 | Na$_2$SO$_4$ | 15 |
| 17(b) | (17a) plus PVSA (100 ppm) | " | 22 | " | 36 |
| 18 | PEI/PVA/PVA/V5PSS/V5PSS/V5PSS | GM-80 (Bag) | 22 | Na$_2$SO$_4$ | 10 |
|   |  |  | 20 | CaCl$_2$ | 43 |
| 19 | PVI/PVI/PVA/PSS/PSS/PVI/PSS/PVSA/PSS | XM-50 | 34 | Na$_2$SO$_4$ | 28 |
|   | PVI/PVI/PVA/PSS/PSS/PVI/PSS/PVA/PSS | " | 28 | CaCl$_2$ | 75 |
| 20 | PEI/PEI/PVA/V5PSS/V5PSS/PSS/PSS | XM-50 | 49 | Na$_2$SO$_4$ | 30 |
|   | PEI/PEI/PVA/V5PSS/V5PSS/PSS/PSS | " | 45 | CaCl$_2$ | 57 |
| 21 | PVI/Starch/PVSA | XM-50 | 18 | Na$_2$SO$_4$ | 9 |
|   | PVI/Starch/PVSA | " | 18 | CaCl$_2$ | 5 |
| 22 | PVI/PVI/PVA/PVA/PVSA | XM-50 | 16 | CaCl$_2$ | 31 |
|   | PVI/PVI/PVA/PVA/PVSA | " | 19 | Na$_2$SO$_4$ | 64 |
| 23 | PVSA/PVSA/PVSA/PAAM/PAAM/Starch/PVA/PVI | XM-50 | 38 | Na$_2$SO$_4$ | 13 |
|   | PVSA/PVSA/PVSA/PAAM/ | " | 40 | CaCl$_2$ | 60 |

-continued

| Example No. | Coating Composition (individual steps) | Membrane Type | Flux GSFD | Coated Membrane Properties Salt Tested | % Rejected |
|---|---|---|---|---|---|
| 24(a) | PAAM/Starch/PVA/PVI PVI (backflush*)/ V7PSS/V7PSS/V7PSS/ PVSA/PAA | XM-50 | 23 | $CaCl_2$ | 29 |
| | PVI (backflush*)/ V7PSS/V7PSS/V7PSS/ PVSA/PAA | " | 24 | $Na_2SO_4$ | 77 |
| 24(b) | (24a) plus PVI (backflush) | " | 8 | $CaCl_2$ | 65 |
| | (24a) plus PVI (backflush) | " | 10 | $Na_2SO_4$ | 33 |
| 25a | PVI/PVI/PVI/PVA/PVA/ PSS | XM-50 | 24 | $Na_2SO_4$ | 30 |
| | PVI/PVI/PVI/PVA/PVA/ PSS | " | 28 | $CaCl_2$ | 81 |
| 25b | (25a) plus PSS/PVSA | " | 13 | $Na_2SO_4$ | 51 |
| 26 | PVI (backflush)/PAA | XM-50 | 20 | $CaCl_2$ | 35 |
| | PVI (backflush)/PAA | " | 25 | $Na_2SO_4$ | 69 |
| 27 | PVI/HYECEL/PAA | XM-50 | 22 | $Na_2SO_4$ | 43 |
| 28 | PVI/PAA(backflush)/ PVI/PVI | XM-50 | 41 | $CaCl_2$ | 8 |
| | PVI/PAA(backflush/ PVI/PVI | " | 31 | $Na_2SO_4$ | 61 |
| 29 | PVI(backflush)/PSS | XM-50 | 20 | $Na_2SO_4$ | 32 |
| | PVI(backflush)/PSS | " | 20 | $CaCl_2$ | 50 |
| 30a | PVI/PVA/PSS/PSS | XM-50 | 15 | $Na_2SO_4$ | 33 |
| | PVI/PVA/PSS/PSS | " | 15 | $CaCl_2$ | 90 |
| 30b | (30a) plus PSS (higher level) | " | 15 | $Na_2SO_4$ | 65 |
| 31 | PVBTMA/PVBTMA/ PVBTMA/PVBTMA/ PVBTMA/Starch/ PVSA | XM-50 | 40 | $Na_2SO_4$ | 26 |
| 32 | PVI/PVA/PSS(all dialysis) | XM-50 | 13 | NaCl | 50 |
| | PVI/PVA/PSS(all dialysis) | " | 11 | $MgSO_4$ | 89 |
| | PVI/PVA/PSS(all dialysis) | " | 19 | $Na_2SO_4$ | 49 |
| | PVI/PVA/PSS(all dialysis) | " | 14 | $CaCl_2$ | 95 |
| 33 | PADMAC/PEI/PVA/PSS | XM-50 | 29 | $CaCl_2$ | 87 |
| | PADMAC/PEI/PVA/PSS | " | 27 | $Na_2SO_4$ | 17 |
| 34 | PAA/PVA/PVI | XM-50 | 2 | $Na_2SO_4$ | 33 |
| | PAA/PVA/PVI | " | 2 | $CaCl_2$ | 44 |
| 35 | PEI and PVI (backflush)/ PAA | XM-50 | 1 | $Na_2SO_4$ | 54 |
| 36 | C32PEI/PAAM/PSS | GM-80 | 39 | $CaCl_2$ | 37 |
| | C32PEI/PAAM/PSS | " | 27 | $Na_2SO_4$ | 2 |
| 37 | PVI/PSS/PSS | GM-80 | 14 | $CaCl_2$ | 32 |
| | PVI/PSS/PSS | " | 14 | $Na_2SO_4$ | 61 |

EXAMPLE 8

PERFORMANCE OF A PREFERRED MEMBRANE

Performance results on a membrane, coated as in Example 1 above are presented below. In all cases the inlet pressure was 30 psig and the permeate pressure was atmospheric. The yield was controlled by varying the outlet pressure from 26–29 psig.

$$\% \text{ Yield} = \frac{100 \text{ (Permeate Flow)}}{\text{(Influent Flow)}}$$

% Overall Rejection =
$$\frac{100[(\text{Influent Concentration}) - (\text{Permeate Concentration})]}{(\text{Influent Concentration})}$$

Coating Composition: (PVI/PVA/PSS/PAA)

| Water Composition | | Yield | % Overall | Flux |
|---|---|---|---|---|
| Salt | Concentration | % | Rejection | Gal./Ft.2 Day |
| NaCl | 550 mg/l | 47.9 | 22.7 | 15.0 |

-continued $$\% \text{ Yield} = \frac{100 \text{ (Permeate Flow)}}{\text{(Influent Flow)}}$$

% Overall Rejection =
$$\frac{100[(\text{Influent Concentration}) - (\text{Permeate Concentration})]}{(\text{Influent Concentration})}$$

Coating Composition: (PVI/PVA/PSS/PAA)

| Water Composition | | Yield | % Overall | Flux |
|---|---|---|---|---|
| Salt | Concentration | % | Rejection | Gal./Ft.2 Day |
| " | " | 66.7 | 18.2 | 15.9 |
| " | " | 73.9 | 16.4 | 16.0 |
| " | " | 80.5 | 12.7 | 15.7 |
| $CaCl_2$ | 520 mg/l | 45.0 | 93.2 | 12.1 |
| " | " | 59.2 | 91.9 | 11.2 |
| " | " | 69.2 | 89.1 | 10.4 |
| " | " | 84.3 | 83.1 | 8.5 |
| $Na_2SO_4$ | 600 mg/l | 37.5 | 86.4 | 14.0 |
| " | " | 60.6 | 79.6 | 12.8 |
| " | " | 69.2 | 73.4 | 12.3 |
| " | " | 79.6 | 61.4 | 11.1 |
| $NaHCO_3$ | 500 mg/l | 51.8 | 31.0 | 14.3 |
| " | " | 65.1 | 27.0 | 14.1 |

-continued $$\% \text{ Yield} = \frac{100 \text{ (Permeate Flow)}}{\text{(Influent Flow)}}$$

% Overall Rejection =
$$\frac{100[(\text{Influent Concentration}) - (\text{Permeate Concentration})]}{(\text{Influent Concentration})}$$

Coating Composition: (PVI/PVA/PSS/PAA)

| Water Composition | | Yield % | % Overall Rejection | Flux Gal./ Ft.2 Day |
|---|---|---|---|---|
| Salt | Concentration | | | |
| " | " | 76.5 | 23.0 | 13.7 |
| " | " | 87.4 | 16.0 | 13.7 |
| NaNO<sub>3</sub> | 500 mg/l | 46.3 | 30.0 | 13.6 |
| " | " | 69.0 | 26.6 | 13.7 |
| " | " | 75.9 | 24.0 | 13.4 |
| " | " | 83.9 | 20.0 | 13.3 |
| MgCl<sub>2</sub> | 600 mg/l | 42.4 | 96.0 | 11.0 |
| " | " | 60.7 | 94.8 | 9.7 |
| " | " | 74.0 | 93.6 | 8.7 |
| " | " | 87.0 | 83.4 | 4.9 |
| MgSO<sub>4</sub> | 500 mg/l | 42.0 | 91.0 | 12.0 |
| " | " | 65.5 | 88.2 | 11.2 |
| " | " | 73.1 | 87.0 | 11.2 |
| " | " | 81.1 | 84.4 | 10.4 |
| KCl | 500 mg/l | 52.5 | 34.0 | 15.7 |
| " | " | 61.5 | 33.0 | 15.9 |
| " | " | 72.4 | 29.4 | 16.0 |
| " | " | 79.2 | 26.0 | 16.0 |
| Ca(HCO<sub>3</sub>)<sub>2</sub> | 467 mg/l | 46.0 | 89.2 | 12.1 |
| " | " | 57.9 | 88.8 | 11.6 |
| " | " | 69.3 | 88.1 | 10.4 |
| " | " | 87.1 | 87.0 | 10.3 |
| CaSO<sub>4</sub> | 125 mg/l | 50.0 | 91.1 | 14.6 |
| " | " | 68.8 | 88.9 | 14.4 |
| " | " | 76.4 | 87.5 | 14.3 |
| " | " | 81.2 | 86.0 | 14.1 |
| 350 ppm Hard Water A* | | 40.9 | 79.2 | 13.3 |
| " | | 51.5 | 76.3 | 12.8 |
| " | | 68.2 | 74.4 | 12.2 |
| " | | 72.8 | 72.4 | 12.0 |
| " | | 82.1 | 69.0 | 11.4 |
| 500 ppm Hard Water B* | | 40.6 | 54.3 | 13.9 |
| " | | 56.8 | 52.8 | 12.6 |
| " | | 67.9 | 51.9 | 12.1 |
| " | | 75.4 | 50.0 | 11.9 |
| " | | 85.0 | 48.1 | 11.5 |

*Hard Water Compositions (ppm as CaCO<sub>3</sub>)

| | $Ca^{++}$ | $Mg^{++}$ | $Na^+$ | $HCO_3$ | $SO_4$ | $Cl$ |
|---|---|---|---|---|---|---|
| (A) | 200 | 125 | 25 | 100 | 225 | 25 |
| (B) | 200 | 125 | 175 | 100 | 225 | 75 |

We claim:

1. An ion-rejecting membrane conprising a semi-permeable membrane substrate having affixed thereto thin substantive coatings of at least one polymeric cationic polyelectrolyte and at least one polymeric anionic polyelectrolyte separated by an essentially neutral layer or coating.

2. An ion-rejecting polymer membrane comprising a semi-permeable polymeric membrane substrate having affixed to an active membrane surface a series of contiguous, microscopically thin coatings or layers of polymeric materials consisting of cationic polymeric polyelectrolytes, anionic polymeric polyelectrolytes, and essentially neutral porous polymers, with at least one pair of oppositely charged polyelectrolyte coatings separated by an interposing coating of said essentially neutral porous polymer, and said polymeric materials being substantive to the surface of the polymeric membrane substrate under ordinary membrane filtration conditions.

3. The ion-rejecting polymeric membrane of claim 2 wherein one or more cationic polymeric polyelectrolyte coatings are attached directly to the active membrane substrate, and a coating of an essentially neutral porous polymer separates said cationic coatings from one or more anionic coatings located furthest from the active membrane surface.

4. The ion-rejecting polymeric membrane of claim 2 wherein the polymeric membrane substrate is a hollow fiber membrane.

5. The ion-rejecting polymeric membrane of claim 2 wherein the polymeric membrane substrate is an anisotropic hollow fiber ultrafiltration membrane.

6. The ion-rejecting polymeric membrane of claim 2 wherein the polymeric membrane substrate is a hollow fiber reverse osmosis membrane.

7. The ion-rejecting polymeric membrane of claim 2 wherein the polymeric membrane substrate is a flat sheet membrane.

8. The ion-rejecting polymeric membrane of claim 2 wherein the polymeric membrane substrate is a sheet membrane.

9. The ion-rejecting polymeric membrane of claim 2 wherein the cationic polymeric polyelectrolyte coatings include a coating of poly(vinyl imidazoline).

10. The ion-rejecting polymeric membrane of claim 2 wherein the anionic polymeric polyelectrolyte coatings include at least one coating of poly(styrene sulfonic acid) or poly(acrylic) acid or both.

11. The ion-rejecting polymeric membrane of claim 2 wherein the essentially nonionic porous polymer is poly(vinyl alcohol).

12. The ion-rejecting polymeric membrane of claim 1 wherein the active membrane surface of the semipermeable membrane substrate serves as the neutral layer for separation of the anionic and cationic polymeric polyelectrolytes.

13. The ion-rejecting polymeric membrane of claim 2 wherein both sides of the active membrane surface are coated with one or more polyelectrolytes of the same or opposite charge with each pair of oppositely charged next adjacent polyelectrolytes separated by an essentially neutral layer or coating.

14. A method of deionizing a solution containing solubilized ionic materials which comprises passing said solution over an ion-rejecting membrane comprising a semi-permeable membrane substrate having affixed thereto thin coatings of at least one polymeric cationic polyelectrolyte and at least one polymeric anionic polyelectrolyte separated by an essentially neutral layer or coating.

15. A method of deionizing a solution containing solubilized ionic materials which comprises passing said solution over an ion-rejecting membrane comprising a semi-permeable polymeric membrane substrate having affixed to an active membrane surface a series of contiguous, microscopically thin coatings or layers of polymeric materials consisting of cationic polymeric polyelectrolytes, anionic polymeric polyelectrolytes, and essentially nonionic porous polymers, with at least one pair of oppositely charged polyelectrolyte coatings separated by an interposing coating of said essentially nonionic porous polymer, and said polymeric materials being substantive to the surface of the polymeric membrane substrate under ordinary membrane filtration conditions.

16. The method of deionizing a solution as claimed in claim 15 wherein the solution is an aqueous solution.

17. The method of deionizing a solution as claimed in claim 15 wherein the polymeric membrane substrate is a hollow fiber membrane.

18. The method of deionizing a solution as claimed in claim 15 wherein the solubilized ionic materials are selected from alkali metal and alkaline earth metal salts or mixtures thereof and the solvent is water.

19. The method of deionizing a solution as claimed in claim 15 wherein the cationic polyelectrolyte coating consists of poly(vinylimidazoline) and the anionic coating comprises poly(styrene sulfonic acid) or poly(acrylic acid), or both.

20. A process for preparing a ion-rejecting membrane which comprises sequentially recirculating dilute solutions of substantive, relatively high molecular weight polymers of cationic polymeric polyelectrolyte, non-ionic porous polymer and anionic polymeric polyelectrolyte over a porous membrane substrate to affix the relatively high molecular weight polymers to the membrane substrate as discrete coatings with each adjacent pair of oppositely charged polyelectrolytes separated by an interposing coating of neutral porous polymer.

* * * * *